United States Patent
Nakajima et al.

(10) Patent No.: US 10,384,254 B2
(45) Date of Patent: Aug. 20, 2019

(54) METHOD OF MANUFACTURING HOT-PRESSED MEMBER

(71) Applicant: JFE Steel Corporation, Tokyo (JP)

(72) Inventors: Seiji Nakajima, Tokyo (JP); Minako Morimoto, Tokyo (JP); Satoru Ando, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 259 days.

(21) Appl. No.: 14/901,754

(22) PCT Filed: Jun. 2, 2014

(86) PCT No.: PCT/JP2014/002904
§ 371 (c)(1),
(2) Date: Dec. 29, 2015

(87) PCT Pub. No.: WO2015/001705
PCT Pub. Date: Jan. 8, 2015

(65) Prior Publication Data
US 2016/0151822 A1    Jun. 2, 2016

(30) Foreign Application Priority Data

Jul. 2, 2013    (JP) ................... 2013-138512

(51) Int. Cl.
*C22C 38/60*    (2006.01)
*B21D 22/20*    (2006.01)
(Continued)

(52) U.S. Cl.
CPC .......... *B21D 22/208* (2013.01); *B32B 15/013* (2013.01); *C21D 1/18* (2013.01);
(Continued)

(58) Field of Classification Search
CPC .................................................... B32B 15/013
See application file for complete search history.

(56) References Cited

U.S. PATENT DOCUMENTS

| | | | |
|---|---|---|---|
| 2014/0057130 A1 | 2/2014 | Flechtner et al. | |
| 2016/0160322 A1 | 6/2016 | Kuhn et al. | |
| 2017/0191170 A1* | 7/2017 | Flechtner | C10M 111/00 |

FOREIGN PATENT DOCUMENTS

| | | | | |
|---|---|---|---|---|
| CA | 2820571 A1 * | 6/2012 | ........... | B32B 15/013 |
| DE | 10 2011 001 140 | 9/2012 | | |

(Continued)

OTHER PUBLICATIONS

Japanese Office Action dated Jan. 26, 2016 of corresponding Japanese Application No. 2014-544274 along with a Concise Statement of Relevance of Office Action in English.

(Continued)

*Primary Examiner* — Scott R Kastler
(74) *Attorney, Agent, or Firm* — DLA Piper LLP (US)

(57) ABSTRACT

A method of manufacturing a hot-pressed member including heating a coated steel sheet to 850° C. to 950° C., the coated steel sheet including a substrate steel sheet and a coating layer formed on the substrate steel sheet and containing 10% to 25% by mass of Ni and the balance being Zn and incidental impurities, in which the coating weight of the coating layer is 10 to 90 g/m² per a side; and starting hot press forming when the temperature of the coated steel sheet which has been heated is 650° C. to 800° C.

2 Claims, 1 Drawing Sheet

FORMING HEIGHT: 40 mm

CORNER R: RADIUS 6 mm

(51) Int. Cl.
| | |
|---|---|
| *C21D 1/18* | (2006.01) |
| *C21D 1/673* | (2006.01) |
| *C21D 9/46* | (2006.01) |
| *C22C 18/00* | (2006.01) |
| *C22C 19/03* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/28* | (2006.01) |
| *C22C 38/32* | (2006.01) |
| *C25D 5/14* | (2006.01) |
| *C25D 5/50* | (2006.01) |
| *C25D 7/06* | (2006.01) |
| *B32B 15/01* | (2006.01) |

(52) U.S. Cl.
CPC ............... *C21D 1/673* (2013.01); *C21D 9/46* (2013.01); *C22C 18/00* (2013.01); *C22C 19/03* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/28* (2013.01); *C22C 38/32* (2013.01); *C22C 38/60* (2013.01); *C25D 5/14* (2013.01); *C25D 5/50* (2013.01); *C25D 7/0614* (2013.01); *C21D 2251/02* (2013.01); *C22C 38/00* (2013.01)

(56) References Cited

FOREIGN PATENT DOCUMENTS

| | | |
|---|---|---|
| EP | 2 602 359 | 6/2013 |
| EP | 2 684 985 | 1/2014 |
| EP | 2 719 796 | 4/2014 |
| GB | 1 490 535 A | 11/1977 |
| JP | 2001-353548 A | 12/2001 |
| JP | 2004-211147 A | 7/2004 |
| JP | 2006-037141 A | 2/2006 |
| JP | 2006-299377 A | 11/2006 |
| JP | 2007-56307 | 3/2007 |
| JP | 2007-314817 | 12/2007 |
| JP | 2010-180428 A | 8/2010 |
| JP | 2012-197505 | 10/2012 |
| JP | 2012-233248 A | 11/2012 |
| JP | 2012-251230 A | 12/2012 |
| JP | 2012-251232 A | 12/2012 |
| JP | 2013-185184 A | 9/2013 |
| WO | 2010/005121 A1 | 1/2010 |
| WO | 2011/023418 | 3/2011 |
| WO | 2012/169389 | 12/2012 |

OTHER PUBLICATIONS

Japanese Office Action dated Jun. 14, 2016, of corresponding Japanese Application No. 2014-544274, along with a Concise Statement of Relevance of Office Action in English.
Chinese Office Action dated Aug. 10, 2016, of corresponding Chinese Application No. 201480036951.1, with a Concise Statement of Relevance of Office Action in English.
Supplementary European Search Report dated Jun. 20, 2016, of corresponding European Application No. 14819849.2.
Fang, D.W., et al., "State-of-the-Knowledge on Coating Systems for Hot Stamped Parts," *Steel Research International*, vol. 83, No. 5, May 1, 2012, pp. 412-433.
Kondratiuk, J., et al., "Zinc coatings for hot sheet metal forming: Comparison of phase evolution and microstructure during heat treatment," *Surface and Coatings Technology*, vol. 205, No. 17, Mar. 1, 2011, pp. 4141-4153.
Korean Office Action dated Mar. 20, 2017, of corresponding Korean Application No. 2016-7002756, along with a Concise Statement of Relevance of Office Action in English.
Chinese Office Action dated May 25, 2017, of corresponding Chinese Application No. 201480036951.2, along with a Concise Statement of Relevance of Office Action in English.
Korean Office Action dated Sep. 26, 2017, of corresponding Korean Application No. 2016-7002756, along with a Concise Statement of Relevance of Office Action in English.
Korean Office Action dated Jan. 16, 2018, of corresponding Korean Application No. 2016-7002756, along with a Concise Statement of Relevance of Office Action in English.
Chinese Office Action dated Dec. 5, 2017, of corresponding Chinese Application No. 201480036951.2, along with a Concise Statement of Relevance of Office Action in English.
Chinese Office Action dated Jul. 20, 2018, from counterpart Chinse Application No. 2014-80036951.2, along with a Concise Statement of Relevance of Office Action in English.
Communication dated Oct. 17, 2018, of counterpart European Application No. 14819849.2.

* cited by examiner

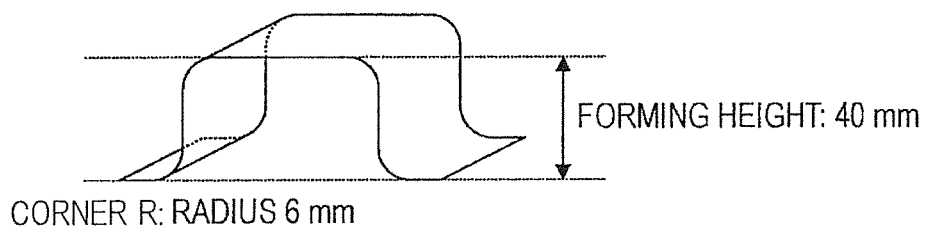

METHOD OF MANUFACTURING HOT-PRESSED MEMBER

TECHNICAL FIELD

This disclosure relates to a method of manufacturing a hot-pressed member. In particular, the method can be suitably applied to the manufacture of automotive chassis, body structural members and the like.

BACKGROUND

Many automotive chassis, body structural members and the like have been hitherto manufactured by subjecting steel sheets having predetermined strength to press working. In recent years, from the viewpoint of global environmental protection, there have been strong demands for reduction in weight of automotive bodies, and there have been continued efforts to increase the strength of steel sheets to be used so that the thickness thereof can be decreased. However, press workability decreases with increasing strength of steel sheets and, therefore, it is often difficult to form steel sheets into a desired member shape.

Accordingly, UK Patent No. 1490535 proposes a working technique referred to as "hot pressing" in which, using a metal mold including a die and a punch, a heated steel sheet is subjected to working and is simultaneously rapidly cooled. That working technique can achieve both facilitation of working and an increase in strength.

However, in hot pressing, since the steel sheet is heated to a high temperature of about 950° C. before hot pressing, scale (iron oxides) is formed on the surface of the steel sheet, and the scale is separated during hot pressing, thereby damaging the metal mold. The hot pressing also has a problem in that scale damages the surface of a member which has been hot-pressed. Furthermore, the scale remaining on the surface of the member may cause poor appearance and degradation in coating adhesion. Consequently, in some cases, the scale on the surface of the member may be usually removed by a performing treatment such as pickling or shot blasting.

However, such removal of scale complicates the process of manufacturing the hot-pressed member and decreases productivity.

Furthermore, automotive chassis, body structural members and the like also require excellent corrosion resistance. In the hot-pressed member manufactured by the method including the step of removing scale as described above, since a rust preventive film such as a coating layer is not provided, corrosion resistance of the member is insufficient.

For this reason, there has been a need for a hot-pressing technique capable of suppressing formation of scale during heating of a steel sheet before hot pressing and improving corrosion resistance of a member after hot pressing. In response to this need, a hot-pressing method has been proposed, which uses a coated steel sheet having a coating layer provided on the surface of a steel sheet. For example, Japanese Patent No. 3663145 discloses a method in which by hot-pressing a steel sheet coated with Zn or a Zn-based alloy, a Zn—Fe-based compound or a Zn—Fe—Al-based compound is formed on the surface thereof, thereby enhancing corrosion resistance of the hot-pressed member.

Furthermore, Japanese Patent No. 4329639 discloses a technique that suppresses liquid metal embrittlement cracking that occurs when molten Zn contained in a coating layer enters a substrate steel sheet during high-temperature heat treatment of the steel sheet before hot pressing. Specifically, JP '639 discloses a steel sheet for heat treatment that includes a Zn coating layer provided on the surface of a steel sheet having a predetermined steel composition, the Zn coating layer being composed of an Fe—Zn alloy having an Fe content of 13% to 80% by mass and an Al content of 0.4% by mass or less and having a Zn coating weight of 10 to 65 g/m$^2$.

In the hot-pressed member manufactured by the method described in JP '145, since a zinc-coated steel sheet or a zinc-aluminum coated steel sheet having a low melting point is used, zinc in the coating layer may enter the steel sheet during hot press forming and causes cracking (liquid metal embrittlement cracking).

Furthermore, even when the coated steel sheet described in JP '639 is used, in some cases, liquid metal embrittlement cracking may occur depending on the hot-pressing conditions of heating temperature, hot-press-forming starting temperature and the like. It has not been possible to completely avoid liquid metal embrittlement cracking.

SUMMARY

It could therefore be helpful to provide a method of manufacturing a hot-pressed member having excellent corrosion resistance, and a method of manufacturing a hot-pressed member having excellent resistance to liquid metal embrittlement, in which liquid metal embrittlement cracking caused by entry of zinc in the coating layer into the steel sheet does not occur.

We found that, when press forming is performed in a state in which a coating layer is melted, a liquid component in the coating layer enters the steel sheet in the region stressed in tension, and liquid metal embrittlement cracking occurs. Furthermore, we found that, to avoid this, it is necessary that the melting point of the coating layer be sufficiently higher than the hot-press-forming starting temperature. We thus provide:

(1) A method of manufacturing a hot-pressed member characterized by including heating a coated steel sheet to 850° C. to 950° C., the coated steel sheet including a substrate steel sheet and a coating layer which is formed on the substrate steel sheet and which contains 10% to 25% by mass of Ni and the balance being Zn and incidental impurities, in which the coating weight of the coating layer is 10 to 90 g/m$^2$ per a side; and starting hot press forming when the temperature of the coated steel sheet which has been heated is 650° C. to 800° C.

(2) A method of manufacturing a hot-pressed member characterized by including heating a coated steel sheet to 850° C. to 950° C., the coated steel sheet including a substrate steel sheet and a coating layer, the coating layer including a coating layer I which is formed on the substrate steel sheet and which contains 60% by mass or more of Ni and the balance being Zn and incidental impurities, and a coating layer II which is formed on the coating layer I and which contains 10% to 25% by mass of Ni and the balance being Zn and incidental impurities, in which the coating weight of the coating layer I is 0.01 to 5 g/m$^2$ per a side, and the coating weight of the coating layer II is 10 to 90 g/m$^2$ per a side; and starting hot press forming when the temperature of the coated steel sheet which has been heated is 650° C. to 800° C.

We make it possible to manufacture a hot-pressed member having excellent resistance to liquid metal embrittlement in which liquid metal embrittlement cracking hardly occurs.

A hot-pressed member manufactured by our methods are also excellent in terms of corrosion resistance.

Furthermore, by specifying the ranges of the chemical composition of the substrate steel sheet, a hot-pressed member having sufficient strength can be obtained. Furthermore, since the coating layer includes a Zn-based layer, it is possible to suppress formation of scale during heating. Consequently, the hot-pressed member manufactured by the method is suitable for automotive chassis and body structural members.

BRIEF DESCRIPTION OF THE DRAWING

FIG. 1 is a view showing a steel sheet that has been subjected to hat-shape forming in Example.

DETAILED DESCRIPTION

Examples of our methods will be described in detail below. Note that this disclosure is not limited to the examples described below.

The method of manufacturing a hot-pressed member is characterized by including heating a specific coated steel sheet to 850° C. to 950° C., and starting hot press forming when the temperature of the coated steel sheet which has been heated is 650° C. to 800° C. Furthermore, the specific coated steel sheet includes a substrate steel sheet and a coating layer formed on the substrate steel sheet. The substrate steel sheet, the coating layer, the coated steel sheet, and the method of manufacturing a hot-pressed member will be described below in that order.

Substrate Steel Sheet

The substrate steel sheet refers to a hot-rolled steel sheet, a cold-rolled steel sheet or the like commonly used as a substrate steel sheet. The chemical composition of the substrate steel sheet is not particularly limited, but is preferably a chemical composition by which a hot-pressed member having a strength of 980 MPa or more can be easily manufactured.

For example, the chemical composition likely to meet such a strength includes, in percent by mass, 0.15% to 0.5% of C, 0.05% to 2.0% of Si, 0.5% to 3% of Mn, 0.1% or less of P, 0.05% or less of S, 0.1% or less of Al, 0.01% or less of N, and the balance being Fe and incidental impurities. The reasons for limiting the compositional elements will be described below. Hereinafter, "%" indicating the content of the element means "percent by mass" unless otherwise noted.

C: 0.15% to 0.5%

C is an element that improves the strength of steel, and for the TS of a hot-pressed member to be 980 MPa or more, the C content is preferably 0.15% or more. On the other hand, when the C content exceeds 0.5%, blanking workability of the steel sheet as a material may decrease markedly in some cases. Therefore, the C content is preferably 0.15% to 0.5%.

Si: 0.05% to 2.0%

Si is an element that improves the strength of steel, similarly to C, and for the TS of a hot-pressed member to be 980 MPa or more, the Si content is preferably 0.05% or more. On the other hand, when the Si content exceeds 2.0%, occurrence of surface defects referred to as red scale may markedly increase during hot rolling, the rolling force may increase, and ductility of a hot-rolled steel sheet may be degraded in some cases. Furthermore, a Si content of more than 2.0% may adversely affect coating performance when a coating treatment is performed in which a coating layer mainly composed of Zn is formed on the surface of a steel sheet in some cases. Therefore, the Si content is preferably 0.05% to 2.0%.

Mn: 0.5% to 3%

Mn is an element effective in improving hardenability by suppressing ferrite transformation. Furthermore, Mn is an element also effective in decreasing the heating temperature before hot pressing because it decreases the $Ac_3$ transformation temperature. The Mn content is preferably 0.5% or more to obtain such effects. On the other hand, when the Mn content exceeds 3%, segregation may occur, thus decreasing the uniformity of properties of the substrate steel sheet and the hot-pressed member in some cases. Therefore, the Mn content is preferably 0.5% to 3%.

P: 0.1% or less

When the P content exceeds 0.1%, segregation may occur, thereby decreasing uniformity of properties of the steel sheet as a material and the hot-pressed member, and toughness may be decreased markedly in some cases. Therefore, the P content is preferably 0.1% or less.

S: 0.05% or less

When the S content exceeds 0.05%, toughness of the hot-pressed member may be decreased in some cases. Therefore, the S content is preferably 0.05% or less.

Al: 0.1% or less

When the Al content exceeds 0.1%, blanking workability and hardenability of the steel sheet as a material may be decreased in some cases. Therefore, the Al content is preferably 0.1% or less.

N: 0.01% or less

When the N content exceeds 0.01%, AlN nitride may be formed during hot rolling and heating before hot pressing, and blanking workability and hardenability of the steel sheet as a material may be decreased in some cases. Therefore, the N content is preferably 0.01% or less.

The balance is Fe and incidental impurities. Furthermore, for the reasons described below, at least one selected from 0.01% to 1% of Cr, 0.2% or less of Ti, and 0.0005% to 0.08% of B, and 0.003% to 0.03% of Sb are preferably added separately or simultaneously.

Cr: 0.01% to 1%

Cr is an element effective in strengthening steel and improving hardenability. The Cr content is preferably 0.01% or more to obtain such effects. On the other hand, a Cr content exceeding 1% markedly increases the cost. Therefore, the upper limit thereof is preferably 1%.

Ti: 0.2% or less

Ti is an element effective in strengthening steel and improving toughness by refining grains. Furthermore, Ti forms a nitride in preference to B, which is described below and, therefore, by adding Ti, hardenability is improved by solute B. However, when the Ti content exceeds 0.2%, the rolling force during hot rolling may be increased in some cases. Furthermore, when the Ti content exceeds 0.2%, toughness of the hot-pressed member may be decreased in some cases. Therefore, the upper limit thereof is preferably 0.2%.

B: 0.0005% to 0.08%

B is an element effective in improving hardenability during hot pressing and toughness after hot pressing. The B content is preferably 0.0005% or more to obtain such effects. On the other hand, when the B content exceeds 0.08%, the rolling force during hot rolling may be increased and a martensite phase and a bainite phase may be produced after hot rolling, thereby causing cracks in the steel sheet. Therefore, the upper limit thereof is preferably 0.08%.

Sb: 0.003% to 0.03%

Sb has an effect of suppressing formation of a decarburized layer in a surface layer portion of the steel sheet during the period between heating the steel sheet before hot pressing and cooling the steel sheet by a series of hot-pressing processes. The Sb content is preferably 0.003% or more to obtain such an effect. On the other hand, when the Sb content exceeds 0.03%, the rolling force may be increased, thereby decreasing productivity. Therefore, the Sb content is preferably 0.003% to 0.03%.

The method of manufacturing a substrate steel sheet is not particularly limited. When the substrate steel sheet is a cold-rolled steel sheet, for example, a method may be used in which steel having the chemical composition described above is melted and refined, and a steel slab obtained by continuous casting or the like is subjected to hot rolling under specific conditions, followed by pickling and cold rolling, and then subjected to continuous annealing and temper treatment under specific conditions.

Coating Layer

The coating layer is formed on the surface of the substrate steel sheet. A coated steel sheet including a coating layer formed on a substrate steel sheet is used to secure resistance to liquid metal embrittlement. The coating layer is one of the following two.

The first option is a single coating layer containing 10% to 25% by mass of Ni and the balance being Zn and incidental impurities, and the coating weight of the coating layer is 10 to 90 g/m$^2$ per a side.

The second option is a two-layered coating layer including a coating layer I provided on the substrate steel sheet and a coating layer II provided on the coating layer I in which the coating layer I contains 60% by mass or more of Ni and the balance being Zn and incidental impurities, the coating weight of the coating layer I being 0.01 to 5 g/m$^2$ per a side, and the coating layer II contains 10% to 25% by mass of Ni and the balance being Zn and incidental impurities, the coating weight of the coating layer II being 10 to 90 g/m$^2$ per a side.

First, description will be made on coating, which is common (between the single coating layer and the coating layer II), and which contains 10% to 25% by mass of Ni and the balance being Zn and incidental impurities, the coating weight being 10 to 90 g/m$^2$ per a side.

The reason for setting the Ni content at 10% to 25% by mass is that the phase structure of the coating layer is set to be the γ phase whose melting point is 881° C. In this way, liquid metal embrittlement cracking becomes unlikely to occur. Furthermore, the γ phase is characterized by not only having a sacrificial anti-corrosion effect of zinc, but also forming a dense corrosion product. Even after heating, part of the γ phase remains, and thus excellent corrosion resistance can be exhibited. The γ phase has a crystalline structure selected from the group consisting of $Ni_2Zn_{11}$, $NiZn_3$, and $Ni_5Zn_{21}$, and can be confirmed by an X-ray diffraction method.

The balance other than Ni is Zn and incidental impurities.

The reasons for setting the coating weight to be 10 to 90 g/m$^2$ per a side are that when the coating weight is less than 10 g/m$^2$ per a side, corrosion resistance of the hot-pressed member is insufficient, and the coating weight exceeding 90 g/m$^2$ per a side results in an increase in cost. Therefore, the coating weight is 10 to 90 g/m$^2$ per a side.

Next, description will be made on the coating layer I of the two-layered coating layer. As described above, the coating layer I contains 60% by mass or more of Ni and the balance being Zn and incidental impurities, and the coating weight of the coating layer I is 0.01 to 5 g/m$^2$ per a side.

In the two-layered coating layer, by providing the coating layer I on the surface of the steel sheet, it is possible to reliably prevent entry of zinc contained in the coating layer II into the substrate steel sheet, and it is possible to secure resistance to liquid metal embrittlement.

The reason for setting the Ni content of the coating layer I at 60% by mass or more is that the melting point of the coating layer I is increased to a very high temperature of 1,000° C. or higher, at which the coating layer I is not melted during heating before hot pressing.

In the coating layer I, the balance other than Ni is also Zn and incidental impurities.

The coating weight of the coating layer I is 0.01 to 5 g/m$^2$ per a side. When the coating weight is less than 0.01 g/m$^2$ per a side, there is no effect of providing the coating layer I. When the coating weight exceeds 5 g/m$^2$ per a side, not only the effect is saturated, but also the cost increases. Therefore, the coating weight of the coating layer I is set in the range of 0.01 to 5 g/m$^2$ per a side.

Coated Steel Sheet

The coated steel sheet to be used in the method of manufacturing a hot-pressed member includes the substrate steel sheet and the coating layer. The method of forming the coating layer on the substrate steel sheet is not particularly limited, but a commonly used method can be employed. Specific examples of the formation method include hot-dip galvanizing, electroplating, thermal spraying, vapor deposition and the like. Furthermore, when a coating layer is formed, a steel strip serving as a substrate steel sheet may be continuously treated or single cut sheets may be each treated. In general, continuous treatment having high production efficiency is preferable.

Furthermore, preferably, electroplating is employed as the method of coating.

Method of Manufacturing Hot-Pressed Member

The coated steel sheet is heated to a temperature of 850° C. to 950° C. and, then, hot press forming is started by bringing the coated steel sheet into contact with a metal mold when the temperature of the coated steel sheet which has been heated is 650° C. to 800° C.

The reason for setting the heating temperature for the steel sheet before hot pressing to be 850° C. to 950° C. is that when the heating temperature is lower than 850° C., the steel sheet may be insufficiently quenched, and it may not be possible to obtain a desired hardness in some cases. Furthermore, when the heating temperature exceeds 950° C., not only it is uneconomical in terms of energy, but also the corrosion resistance is degraded because the oxidation reaction of zinc proceeds. Furthermore, the heating temperature is preferably equal to or higher than the $Ac_3$ transformation temperature. By setting the heating temperature to be equal to or higher than the $Ac_3$ transformation temperature, the steel sheet is sufficiently quenched, and a desired hardness can be obtained.

Examples of the heating method before hot pressing include heating with an electric furnace, a gas furnace, or the like, flame heating, electrical heating, high-frequency heating, induction heating, far-infrared heating and the like.

A hot-pressed member is manufactured by performing press forming, with the coated steel sheet heated as described above being set in a metal mold including a die and a punch, and performing cooling under desired cooling conditions.

The temperature (forming starting temperature) of the steel sheet at which hot press forming is started by bringing the heated steel sheet into contact with a metal mold is limited to 650° C. to 800° C. When the forming starting temperature is lower than 650° C., the steel sheet may be insufficiently quenched, and it may not be possible to obtain a desired hardness (strength) in some cases. When the forming starting temperature exceeds 800° C., liquid metal embrittlement cracking may occur in some cases. As described above, the single coating layer or the coating layer II is composed of the γ phase whose melting point is 881° C. In the existing hot pressing process, since the forming starting temperature exceeds 800° C., the solidification reaction of the coating layer does not finish completely during transportation from the heating furnace to the pressing machine. The reason for this is that the temperature at which solidification of the coating layer is completed with certainty is 800° C. or lower. On the other hand, liquid metal embrittlement cracking occurs when the coating layer is a liquid and tensile stress is applied to a region of the steel sheet by press forming. Accordingly, after solidification of the coating layer is completed with certainty by limiting the forming starting temperature to the range of 650° C. to 800° C., hot press forming is performed. Consequently, it is possible to manufacture a hot-pressed member having excellent resistance to liquid metal embrittlement in which liquid metal embrittlement cracking does not occur.

Furthermore, after heating, the method of decreasing the temperature of the coated steel sheet to the forming starting temperature is not particularly limited. For example, the coated steel sheet may be positively cooled using cooling water or the like, or the transportation time from the heating furnace to the pressing machine may be prolonged so that the temperature of the coated steel sheet can be 650° C. to 800° C.

Example 1

As substrate steel sheets, cold-rolled steel sheets having an $Ac_3$ transformation temperature of 820° C. and a thickness of 1.6 mm were used, the cold-rolled steel sheets having a chemical composition including, in percent by mass, 0.23% of C, 0.25% of Si, 1.2% of Mn, 0.01% of P, 0.01% of S, 0.03% of Al, 0.005% of N, 0.2% of Cr, 0.02% of Ti, 0.0022% of B, 0.008% of Sb, and the balance being Fe and incidental impurities. Zn—Ni plating was performed, by an electroplating process, on both surfaces of the cold-rolled steel sheets, and thereby, steel sheet Nos. 1 to 17 were produced. The Zn—Ni plating was performed in a plating bath having a pH of 1.5 and a temperature of 50° C. containing 200 g/L of nickel sulfate hexahydrate and 10 to 100 g/L of zinc sulfate heptahydrate, at a current density of 5 to 100 A/dm². The Ni content was adjusted by changing the amount of zinc sulfate heptahydrate added and the current density, and the coating weight was adjusted by changing the current applying time. In steel sheet Nos. 10 to 13, prior to Zn—Ni plating, Ni plating or Ni—Zn plating was performed as a coating layer I. The Ni plating was performed in a plating bath having a pH of 3.6 and a temperature of 50° C. containing 240 g/L of nickel sulfate hexahydrate and 30 g/L of boric acid, at a current density of 5 A/dm². The coating weight was adjusted by changing the current applying time. Furthermore, in steel sheet No. 11, the Ni content was adjusted by adding zinc sulfate heptahydrate. Furthermore, a hot-dip galvanized steel sheet (GI) was produced by performing hot-dip galvanizing on both surfaces of the cold-rolled steel sheet, and a hot-dip galvannealed steel sheet (GA) was produced by performing hot-dip galvannealing on both surfaces of the cold-rolled steel sheet, which are indicated as steel sheet Nos. 18 and 19, respectively. In steel sheet No. 18 (GI), the coating layer had a chemical composition including 0.7% of Al and the balance being Zn and incidental impurities, the melting point of the coating layer was 420° C., and the coating weight of the coating layer was 60 g/m² per a side. Furthermore, in steel sheet No. 19 (GA), the coating layer had a chemical composition including 10% of Fe, 0.2% of Al, and the balance being Zn and incidental impurities, the melting point of the coating layer was 665° C., and the coating weight of the coating layer was 45 g/m² per a side. The details of the coating layers of steel sheet Nos. 1 to 19 are shown in Table 1.

A test specimen with a size of 100 mm×200 mm was taken from each of steel sheet Nos. 1 to 19 thus produced. The steel sheets were heated by an electric furnace to the heating temperature shown in Table 1, and then hot press forming was performed at the forming starting temperature shown in Table 1. The forming starting temperature was adjusted by adjusting the transportation time from the heating furnace to the pressing machine. The hot press forming was performed using a hat-shaped metal mold including a punch having a shoulder R portion with a radius of 6 mm and a die having a shoulder R portion with a radius of 6 mm. By performing hat-shape forming with a hold-down pressure of 20 ton at a forming rate of 200 mm/second, a hat-shaped member having a forming height of 40 mm shown in FIG. 1 was produced.

Regarding each of the hat-shaped members produced, hardenability and resistance to liquid metal embrittlement were evaluated by the methods described below:

Hardenability: A sample was taken from the hat-shaped member by cutting the hat-shaped member crosswise. The Vickers hardness was measured at 10 points with a pitch of 20 mm (load: 5 kgf), and the evaluation was made on the basis of the minimum value.

◯: Vickers hardness ≥400 x: Vickers hardness <400

Resistance to liquid metal embrittlement: A sample for cross-sectional observation was taken from the shoulder R portion (outer surface side) of the hat-shaped member. By observing the sample with a scanning electron microscope (SEM), the maximum depth of cracks penetrating the base material was evaluated.

◯: Maximum crack depth=0 mm (not occurred)

x: Maximum crack depth >0 mm (occurred)

The evaluation results of hardenability and resistance to liquid metal embrittlement are shown in Table 1.

TABLE 1

| Steel sheet No. | Coating layer I | | Coating layer II | | Hot-pressing conditions | | Hardenability | | Resistance to liquid metal embrittlement | | Remarks |
|---|---|---|---|---|---|---|---|---|---|---|---|
| | Ni content (mass %) | Coating weight* (g/m²) | Ni content (mass %) | Coating weight* (g/m²) | Heating temperature (° C.) | Forming starting temperature (° C.) | Vickers hardness | Evaluation | Maximum crack depth (mm) | Evaluation | |
| 1 | — | — | 12 | 50 | 900 | 750 | 450 | ◯ | 0 | ◯ | Example |
| 2 | — | — | 10 | 50 | 900 | 750 | 450 | ◯ | 0 | ◯ | Example |
| 3 | — | — | 25 | 50 | 900 | 750 | 450 | ◯ | 0 | ◯ | Example |
| 4 | — | — | 12 | 10 | 900 | 750 | 450 | ◯ | 0 | ◯ | Example |
| 5 | — | — | 12 | 90 | 900 | 750 | 450 | ◯ | 0 | ◯ | Example |
| 6 | — | — | 12 | 50 | 850 | 750 | 450 | ◯ | 0 | ◯ | Example |

TABLE 1-continued

| Steel sheet No. | Coating layer I | | Coating layer II | | Hot-pressing conditions | | Hardenability | | Resistance to liquid metal embrittlement | | Remarks |
| | Ni content (mass %) | Coating weight* (g/m²) | Ni content (mass %) | Coating weight* (g/m²) | Heating temperature (° C.) | Forming starting temperature (° C.) | Vickers hardness | Evaluation | Maximum crack depth (mm) | Evaluation | |
|---|---|---|---|---|---|---|---|---|---|---|---|
| 7 | — | — | 12 | 50 | 950 | 750 | 450 | ○ | 0 | ○ | Example |
| 8 | — | — | 12 | 50 | 900 | 650 | 450 | ○ | 0 | ○ | Example |
| 9 | — | — | 12 | 50 | 900 | 800 | 450 | ○ | 0 | ○ | Example |
| 10 | 100 | 1 | 12 | 50 | 900 | 750 | 450 | ○ | 0 | ○ | Example |
| 11 | 60 | 1 | 12 | 50 | 900 | 750 | 450 | ○ | 0 | ○ | Example |
| 12 | 100 | 0.01 | 12 | 50 | 900 | 750 | 450 | ○ | 0 | ○ | Example |
| 13 | 100 | 5 | 12 | 50 | 900 | 750 | 450 | ○ | 0 | ○ | Example |
| 14 | — | — | 8 | 50 | 900 | 750 | 450 | ○ | 0.2 | X | Comparative Example |
| 15 | — | — | 12 | 50 | 800 | 750 | 250 | X | 0 | ○ | Comparative Example |
| 16 | — | — | 12 | 50 | 900 | 600 | 250 | X | 0 | ○ | Comparative Example |
| 17 | — | — | 12 | 50 | 900 | 820 | 450 | ○ | 0.1 | X | Comparative Example |
| 18 | Hot-dip galvanized steel sheet (GI) | | | | 900 | 750 | 450 | ○ | 0.2 | X | Comparative Example |
| 19 | Hot-dip galvannealed steel sheet (GA) | | | | 900 | 750 | 450 | ○ | 0.1 | X | Comparative Example |

*per a side

In steel sheet Nos. 1 to 13 manufactured by our method of manufacturing a hot-pressed member, excellent hardenability and resistance to liquid metal embrittlement are evidently exhibited. Furthermore, in all of the hat-shaped members manufactured by our method of manufacturing a hot-pressed member, a strength of 980 MPa or more was obtained.

Example 2

As substrate steel sheets, cold-rolled steel sheets having the $Ac_3$ transformation temperature shown in Table 2 and a thickness of 1.6 mm were used, the cold-rolled steel sheets having the chemical composition of steel sheet shown in Table 2 and the balance being Fe and incidental impurities. Zn—Ni plating was performed on both surfaces of the cold-rolled steel sheets as in Example 1 and, thereby, steel sheet Nos. 20 to 39 having the Ni content and the coating weight shown in Table 3 were produced. In steel sheet Nos. 35 to 39, prior to Zn—Ni plating, Ni plating was performed as a coating layer I, as in Example 1.

Regarding each of steel sheet Nos. 20 to 39 thus produced, a hat-shaped member was produced, and hardenability and resistance to liquid metal embrittlement were evaluated as in Example 1.

The evaluation results of hardenability and resistance to liquid metal embrittlement are shown in Table 3.

TABLE 2

| Steel type | Chemical composition of steel sheet (mass %) | | | | | | | | | | | Ac3 transformation temperature (° C.) |
| | C | Si | Mn | P | S | Al | N | Cr | Ti | B | Sb | |
|---|---|---|---|---|---|---|---|---|---|---|---|---|
| A | 0.24 | 0.25 | 1.3 | 0.02 | 0.005 | 0.02 | 0.003 | — | — | — | — | 805 |
| B | 0.18 | 0.25 | 1.3 | 0.02 | 0.005 | 0.02 | 0.003 | 0.15 | — | — | — | 816 |
| C | 0.42 | 0.25 | 1.3 | 0.02 | 0.005 | 0.02 | 0.003 | — | 0.03 | — | — | 785 |
| D | 0.24 | 0.10 | 1.3 | 0.02 | 0.005 | 0.02 | 0.003 | — | — | 0.0025 | — | 798 |
| E | 0.24 | 1.65 | 1.3 | 0.02 | 0.005 | 0.02 | 0.003 | 0.02 | 0.03 | — | — | 879 |
| F | 0.24 | 0.25 | 0.6 | 0.02 | 0.005 | 0.02 | 0.003 | 0.80 | — | 0.0025 | — | 817 |
| G | 0.24 | 0.25 | 2.5 | 0.02 | 0.005 | 0.02 | 0.003 | — | 0.16 | 0.0025 | — | 833 |
| H | 0.24 | 0.25 | 1.3 | 0.08 | 0.005 | 0.02 | 0.003 | 0.15 | 0.03 | 0.0010 | — | 857 |
| I | 0.24 | 0.25 | 1.3 | 0.02 | 0.04 | 0.02 | 0.003 | — | — | — | 0.008 | 805 |
| J | 0.24 | 0.25 | 1.3 | 0.02 | 0.005 | 0.08 | 0.003 | 0.15 | — | — | 0.008 | 827 |
| K | 0.24 | 0.25 | 1.3 | 0.02 | 0.005 | 0.02 | 0.009 | — | 0.03 | — | 0.008 | 817 |
| L | 0.24 | 0.25 | 1.3 | 0.02 | 0.005 | 0.02 | 0.003 | — | — | 0.07 | 0.008 | 805 |
| M | 0.24 | 0.25 | 1.3 | 0.02 | 0.005 | 0.02 | 0.003 | 0.15 | 0.03 | — | 0.004 | 815 |
| N | 0.24 | 0.25 | 1.3 | 0.02 | 0.005 | 0.02 | 0.003 | 0.15 | — | 0.0025 | 0.025 | 803 |
| O | 0.24 | 0.25 | 1.3 | 0.02 | 0.005 | 0.02 | 0.003 | — | 0.03 | 0.0025 | 0.008 | 817 |

TABLE 3

| Steel sheet No. | Steel type | Coating layer I | | Coating layer II | | Hot-pressing conditions | | Hardenability | | Resistance to liquid metal embrittlement | | Remarks |
|---|---|---|---|---|---|---|---|---|---|---|---|---|
| | | Ni content (mass %) | Coating weight* (g/m²) | Ni content (mass %) | Coating weight* (g/m²) | Heating temperature (° C.) | Forming starting temperature (° C.) | Vickers hardness | Evaluation | Maximum crack depth (mm) | Evaluation | |
| 20 | A | — | — | 12 | 50 | 900 | 750 | 450 | ○ | 0 | ○ | Example |
| 21 | B | — | — | 12 | 50 | 900 | 750 | 405 | ○ | 0 | ○ | Example |
| 22 | C | — | — | 12 | 50 | 900 | 750 | 530 | ○ | 0 | ○ | Example |
| 23 | D | — | — | 12 | 50 | 900 | 750 | 450 | ○ | 0 | ○ | Example |
| 24 | E | — | — | 12 | 50 | 900 | 750 | 450 | ○ | 0 | ○ | Example |
| 25 | F | — | — | 12 | 50 | 900 | 750 | 450 | ○ | 0 | ○ | Example |
| 26 | G | — | — | 12 | 50 | 900 | 750 | 450 | ○ | 0 | ○ | Example |
| 27 | H | — | — | 12 | 50 | 900 | 750 | 450 | ○ | 0 | ○ | Example |
| 28 | I | — | — | 12 | 50 | 900 | 750 | 450 | ○ | 0 | ○ | Example |
| 29 | J | — | — | 12 | 50 | 900 | 750 | 450 | ○ | 0 | ○ | Example |
| 30 | K | — | — | 12 | 50 | 900 | 750 | 450 | ○ | 0 | ○ | Example |
| 31 | L | — | — | 12 | 50 | 900 | 750 | 450 | ○ | 0 | ○ | Example |
| 32 | M | — | — | 12 | 50 | 900 | 750 | 450 | ○ | 0 | ○ | Example |
| 33 | N | — | — | 12 | 50 | 900 | 750 | 450 | ○ | 0 | ○ | Example |
| 34 | O | — | — | 12 | 50 | 900 | 750 | 450 | ○ | 0 | ○ | Example |
| 35 | A | 100 | 1 | 12 | 50 | 900 | 750 | 450 | ○ | 0 | ○ | Example |
| 36 | B | 100 | 1 | 12 | 50 | 900 | 750 | 405 | ○ | 0 | ○ | Example |
| 37 | C | 100 | 1 | 12 | 50 | 900 | 750 | 530 | ○ | 0 | ○ | Example |
| 38 | D | 100 | 1 | 12 | 50 | 900 | 750 | 450 | ○ | 0 | ○ | Example |
| 39 | I | 100 | 1 | 12 | 50 | 900 | 750 | 450 | ○ | 0 | ○ | Example |

*per a side

In steel sheet Nos. 20 to 39 manufactured by our method of manufacturing a hot-pressed member, excellent hardenability and resistance to liquid metal embrittlement are evidently exhibited. Furthermore, in all of the hat-shaped members manufactured by our method of manufacturing a hot-pressed member, a strength of 980 MPa or more was obtained.

The invention claimed is:

1. A method of manufacturing a hot-pressed member comprising:
   heating a coated steel sheet to 850° C. to 950° C., the coated steel sheet including a substrate steel sheet and a coating layer formed on the substrate steel sheet and containing 10% to 25% by mass of Ni and the balance being Zn and incidental impurities, in which the coating weight of the coating layer is 10 to 90 g/m² per a side; and
   starting hot press forming when the temperature of the coated steel sheet which has been heated is 750° C. to 800° C,
   wherein the coating layer is the outermost layer formed on the substrate steel sheet.

2. A method of manufacturing a hot-pressed member comprising:
   heating a coated steel sheet to 850° C. to 950° C., the coated steel sheet including a substrate steel sheet and a coating layer, the coating layer including a coating layer I formed on the substrate steel sheet and containing 60% by mass or more of Ni and the balance being Zn and incidental impurities, and a coating layer II formed on the coating layer I and containing 10% to 25% by mass of Ni and the balance being Zn and incidental impurities, in which the coating weight of the coating layer I is 0.01 to 5 g/m² per a side, and the coating weight of the coating layer II is 10 to 90 g/m² per a side; and
   starting hot press forming when the temperature of the coated steel sheet which has been heated is 750° C. to 800° C.

* * * * *